W. E. ABBOTT.
RADIATOR FUNNEL.
APPLICATION FILED APR. 16, 1919. RENEWED SEPT. 22, 1921.
1,420,011.
Patented June 20, 1922.
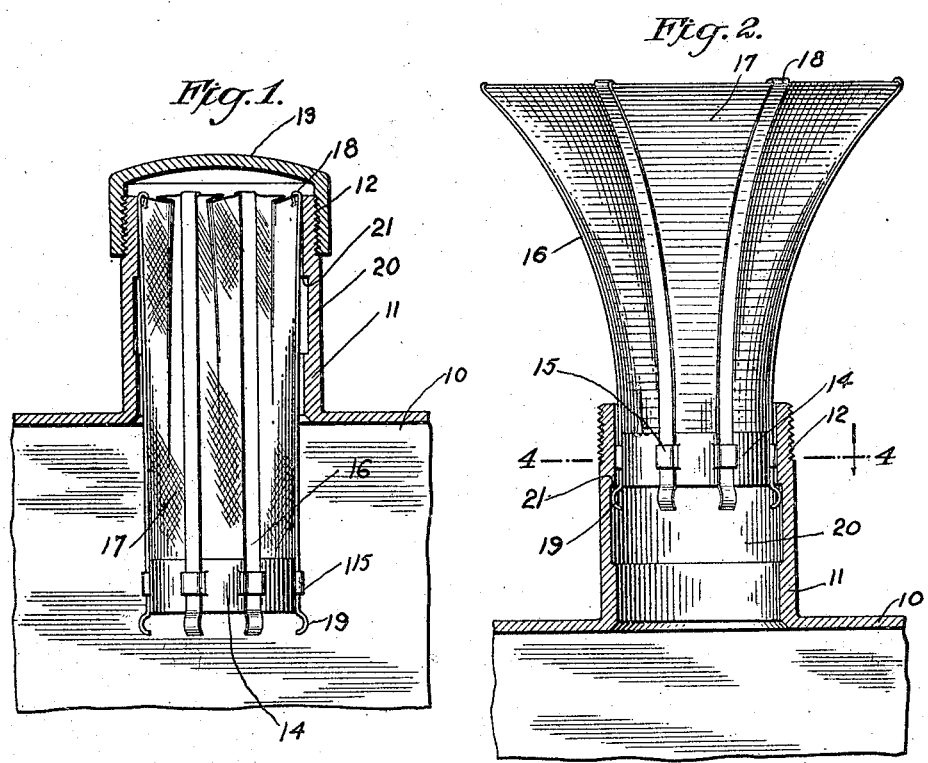
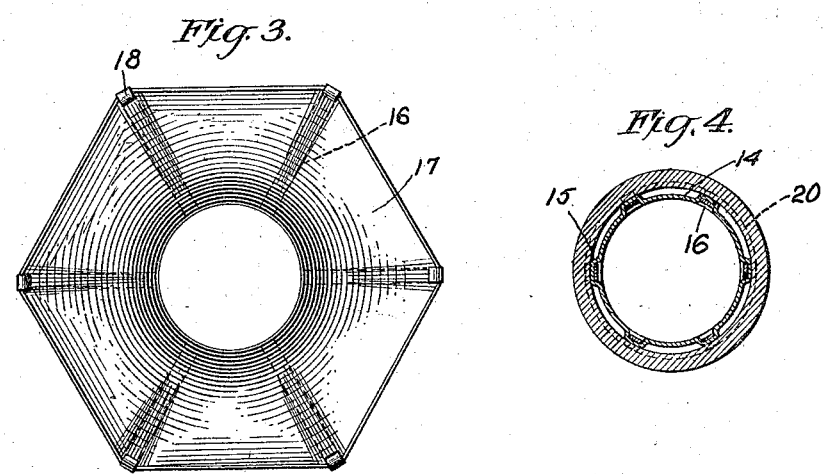
WITNESSES
INVENTOR
WILLIAM EDGAR ABBOTT
BY
ATTORNEYS

UNITED STATES PATENT OFFICE.

WILLIAM EDGAR ABBOTT, OF BEND, OREGON, ASSIGNOR, BY DIRECT AND MESNE ASSIGNMENTS, TO ABBOTT INCORPORATED, OF BEND, OREGON, A CORPORATION OF OREGON.

RADIATOR FUNNEL.

1,420,011. Specification of Letters Patent. Patented June 20, 1922.

Application filed April 16, 1919, Serial No. 290,477. Renewed September 22, 1921. Serial No. 502,591.

*To all whom it may concern:*

Be it known that I, WILLIAM EDGAR ABBOTT, a citizen of the United States, and a resident of Bend, in the county of Deschutes and State of Oregon, have invented a new and Improved Radiator Funnel, of which the following is a full, clear, and exact description.

This invention relates to radiator funnels, and has reference more particularly to a device of this kind for use with the fillers of automobile radiators, the funnel being normally disposed within the filler and being adapted to be withdrawn to assume an operative position.

An object of the invention is to provide a simple and durable funnel to facilitate the filling of automobile radiators with water, which can be inexpensively produced in quantities, which, when not in use, is concealed from view, and which is at all times available when needed.

A further object of the invention is to provide a radiator funnel which is normally positioned within the filler of the radiator, which, when withdrawn from the filler, automatically assumes an operative condition, and which cannot easily be accidentally displaced from the filler.

A still further object of the invention is to provide a radiator funnel which is adapted for use with automobile radiators of different types and kinds, which greatly facilitates the filling of the radiator, which eliminates the accidental splashing of water over the hood or other parts of the automobile, and which may be fashioned from any material suitable for the purpose.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a vertical cross section of a part of an automobile radiator showing the filler of the same, and an embodiment of my invention associated therewith;

Figure 2 is a similar view showing the funnel in extended, operative position;

Figure 3 is a plan view of the funnel ready for use; and

Figure 4 is a transverse section on the line 4—4 of Figure 2.

Before proceeding to a more detailed explanation of my invention, it should be understood that while I prefer to fashion the same from sheet or strip metal and a suitable fabric, any other material adapted for the purpose may be employed. The funnel is usually used in combination with the filler of an automobile radiator, but the particular type or kind of radiator filler entering into the combination forms no part of the invention. Certain of the details of construction shown herewith may be varied in accordance with necessity or individual preference, without departing from the spirit of the invention.

Referring more particularly to the drawings, I have illustrated, for example, the upper part or head 10 of an automobile radiator of conventional type. This has the usual upwardly extending tubular filler 11, threaded at its free end 12, to receive the correspondingly threaded filler cap 13, which normally closes the filler. The radiator is usually filled with water for the purpose of cooling the motor, and the water is introduced into the radiator through the filler 11. Ordinarily, a removable metal or other funnel is employed in this operation. In the absence of such a funnel, which must be carried in the automobile or procured when necessary, it is difficult to fill the radiator, and water is generally splashed over the hood of the machine and other parts thereof, in an attempt to fill the radiator without a funnel. To eliminate these disadvantages I provide a serviceable funnel which will be at all times available for use, and which when not employed is concealed.

The funnel proper of my invention has a base shown in the form of a metal band or ring 14, somewhat smaller in diameter than the inner diameter of the filler 11. The band is provided with a plurality of external, offset, outwardly disposed sockets 15, punched or stamped from the body of the metal. A corresponding number of ribs 16, of spring material such as metal, and normally of arcuate form, are mounted about the ring 14, each being received in one of the sockets 15 and securely held in position thereby. The sockets may be pressed upon the ribs, or the latter may be soldered in position, if additional strength is desired. Each of the ribs, at its lower end, projects below the ring 14 and is outwardly curved or deflected for a purpose which will be described hereinafter.

As is shown in Figure 2, the ribs, when in normal position, extend upward and outward from the ring 14, forming in the aggregate a bell or funnel-shaped frame. The funnel body is formed by means of a suitable fabric 17, attached at its lower end to the ring 14 and having its upper end held by the extremities 18 of the ribs, which are in-turned and clamped upon the upper edge of the fabric. If so desired, the fabric may be of waterproof material.

The outwardly curved or offset lower extremities 19, of the ribs, form stops adapted to engage any available part of the filler, to limit the withdrawal of the funnel from the filler within which it is normally positioned. As is shown for example herewith, the filler has an annular groove 20 formed therein, the upper edge of which presents a shoulder 21 which may be engaged by the stops 19, as is illustrated in Figure 2. Owing to the normal resiliency of the ribs 16 and their tendency to assume the extended position shown in Figure 2, when the funnel is withdrawn it will automatically take an operative position. Since the funnel is fitted directly into the filler and in frictional contact with the inner surface of the latter, the maximum capacity of the funnel is realized in practice. When it is no longer needed it is forced down into the filler and automatically collapses as shown in Figure 1. The normal resilient tendency of the ribs to spring outward to the flared form of Fig. 2 causes sufficient friction between the funnel and the top of the filler, when in the carrying position of Fig. 1, to prevent the funnel from dropping down out of reach when wanted. When not in use, the funnel is concealed by the filler cap 13.

I claim:

1. A collapsible radiator funnel tending normally to assume a flared operative condition and comprising a ring having sockets, a corresponding number of resilient ribs of arcuate form each secured to one of said sockets and held thereby in fixed position with respect to the ring, each rib having its lower end projecting below the holding socket and deflected outward for engagement with the radiator filler, and a collapsible flexible funnel body supported by said ribs and attached thereto, said body being adapted to collapse with the ribs within the filler.

2. A funnel comprising a ring, a series of resilient arc shaped ribs secured intermediate of their ends to the ring, the ends of the ribs above the ring being the longer and extending normally upward and outward therefrom, while the shorter lower ends of the ribs are deflected outward from the ring to serve as a limiting means for the movement of the funnel, and a flexible collapsible funnel body supported by said ribs.

3. The herein described collapsible radiator funnel comprising, in combination, a rigid hollow base, a plurality of resilient ribs secured to the base and extending upward therefrom, said ribs being outwardly bent and having a normal tendency to flare outward away from one another at their upper ends, a collapsible flexible funnel body attached to said ribs and supported thereby, said body being adapted to collapse with the ribs when the funnel is forced downward into the radiator filler, and means extending beneath the funnel base and adapted to co-operate with said filler to limit the upward movement of the funnel, substantially as set forth.

4. A collapsible radiator funnel tending normally to assume an operative condition and resiliently resisting a return to a collapsible condition, said funnel comprising a ring having outwardly disposed sockets, a corresponding number of spring-metal ribs of arcuate form each received in one of said sockets and securely held in position thereby, each rib having its lower end projecting below the ring and curved for engagement with the interior wall of a radiator filler, and a liquid-proof fabric supported by said ribs and attached to the upper ends thereof, said fabric forming the funnel body and adapted to collapse with the ribs.

WILLIAM EDGAR ABBOTT.